United States Patent [19]

Lowry et al.

[11] 4,073,759
[45] Feb. 14, 1978

[54] PROTECTING RUSTY METAL

[75] Inventors: James M. Lowry; David Azar, both of Baton Rouge, La.

[73] Assignee: Roadways International Corporation, Baton Rouge, La.

[21] Appl. No.: 692,556

[22] Filed: June 3, 1976

Related U.S. Application Data

[63] Continuation-in-part of Ser. No. 577,829, May 14, 1975, abandoned.

[51] Int. Cl.$^2$ ............................................. C08L 91/00
[52] U.S. Cl. ........................... 260/28.5 AS; 260/4 R; 260/5; 427/385; 428/463; 428/468
[58] Field of Search .................... 260/4 R, 5, 28.5 AS; 427/385; 428/463, 468

[56] References Cited

U.S. PATENT DOCUMENTS

| | | | |
|---|---|---|---|
| 3,497,371 | 2/1970 | Chang | 106/277 |
| 3,549,579 | 12/1970 | Sinclair | 260/28.5 AS |

*Primary Examiner*—Melvyn I. Marquis
*Attorney, Agent, or Firm*—Connolly and Hutz

[57] ABSTRACT

Rust or corroded metal is very effectively protected by a coating deposited from an emulsion of asphalt, acrylic resin and rubber containing a polyamine surface active agent. No sand blasting, pickling, preparatory coating or other extensive preparatory treatment of the rusty or corroded metal is needed. Uncorroded metal is also protected by the coating.

16 Claims, No Drawings

PROTECTING RUSTY METAL

The present application is a continuation-in-part of application Ser. No. 577,829 filed May 14, 1975 and now abandoned.

The present invention relates to protecting rusty or corroded metal, more particularly to coatings for that purpose.

Among the objects of the present invention is the provision of novel coating processes and mixtures that do a very good job of protecting rusty or corroded metal against further corrosion. They also protect metal that is not corroded.

The foregoing as well as additional objects of the present invention will be more fully discussed in the following description of several of its exemplifications.

According to the present invention rusty metal is protected against further corrosion by applying to the rusty surface a layer of an emulsion of asphalt, acrylic resin and rubber in water, the emulsion containing at least about ½% of a polyamine surface active agent based on the weight of the dry asphalt approximately 20% acrylic polymer, and about 2 to about 5% rubber based on the weight of the dry asphalt. A preferred content of polyamine surface active agent is about 0.6% to about 1% based on the weight of the dry asphalt, and contents of over about 2% are not of greater help. Other corrodible metals such as copper, aluminum and zinc are also protected by such a coating. The acrylic resin, at about 20% by weight dry asphalt, eliminates the tendency of the residual asphalt film to oxidize upon weathering. This resin combines chemically with the asphalt and replaces the fillers that were originally added, in prior patents, to asphalt films to eliminate cracking.

The layer of emulsion can be applied by airless or airpropelled spraying, brushing, rolling, dipping, or even by hosing or pouring a puddle of the coating mixture on a portion of a large surface to be covered, and then spreading the puddle over the entire surface with spreader bars or the like. The surface being coated should not be grease-covered or oil-covered, but need not be scrupulously scrubbed. Thin films of oil or grease, i.e., films not over about 0.5 mil in thickness, do not interfere with the adhesion of the coatings of the present invention. Rust is somewhat porous and absorbs some of the coating so that the coating application is preferably extra heavy in heavily rusted locations, if it is not desired to remove some of that rust. As little as 1 mil of wet coating is effective but at least 3 mils thick is preferred, and loose pieces of rust, scale and other foreign objects should be swept off the surface before applying coatings. Sand blasting, pickling, undercoatings or other radical preparatory operations are not needed for the present invention.

When freshly applied the coating layer still contains most of the water in which the asphalt is emulsified, and the coating thickness diminishes, that is there is film shrinkage, as the layer dries. However the asphalt-acrylic-rubber mixture adheres tenaciously to the metal thus coated, and on drying displaces all water, as well as water-carried electrolytes from the surface of the metal, leaving a strongly protective water-free coating after the drying is completed. This displacement action is effective even when the mixture is applied over metal wet with water.

The coating mixtures of the present invention tend to be viscous when their water content is less than about 50% by weight, and relatively thick coating layers tend to be formed from such highly concentrated mixtures. Such layers, before drying, can be 10 to 20 or more mils thick when the emulsion contains only about 35% water and dry relatively slowly — generally taking 15 minutes or more before becoming tack-free even in warm weather. Adding water to the concentrated emulsions to bring their water content to 50% or more by weight makes them sufficiently mobile to readily apply layers as thin as 1 mil or even less, and these dry much more rapidly.

On the other hand the more mobile emulsions are easier to prepare, and they can be thickened with a viscosity-increasing agent such as methyl cellulose to make it easier to apply coatings which after drying are up to about 15 mils thick. Greater thicknesses are not desirable.

Freshly dried coatings may still redisperse to some extent in water, but upon standing for a few additional minutes they cure to a hard layer that no longer is redispersible in the absence of heat and agitation.

Airless or air-propelled spraying of the coating mixture cause volatilization of some of its water, and this should be taken into consideration in determining the coating thickness desired.

While any emulsifiable asphalt can be used in the coating mixtures of the present invention, the harder asphalts are preferred. Penetration values of from about 50 to about 100 (ASTM D-549) give good results and those from about 60 to about 80 are preferred. Unblown asphalts are also preferred. Asphalts that have low softening points, e.g., ring-and-ball softening temperatures below 110° F, take too long to become tack-free, particularly in hot weather, and are not preferred.

The acrylic resin, rubber and polyamine of the present invention cooperate with the asphalt to make the combination a highly protective one even for badly rusted metal. Moreover the coatings of this invention are extremely weather-resistant and show no significant deterioration when exposed outdoors in southern climates for more than 18 months. The acrylic resin seems to sharply reduce the tendency for the asphalt to crack on weathering, and the polyamine contained in the coating appears to further preserve the mixture. Inasmuch as these coatings are relatively inexpensive to manufacture as well as to apply, and they need very little preparation of the surface to be coated, they are particularly suited for such use as protecting outdoor equipment, as for example chemical plants, metal barges, boat hulls, tankers, roofs of all kinds, etc. These coatings resist highly corrosive atmospheres like those in an aluminum chloride manufacturing plant and do so even when applied directly to rusty ferrous metal or other corroded metals covered with water containing some dissolved aluminum chloride.

The drying and curing action varies with weather conditions, hot windy weather giving quickest results.

Fillers such as anti-fouling materials including cuprous oxide and tri-n-butyl tin hydroxide, and thickeners including very finely divided silica, are compatible in the emulsion of the present invention as well as the coatings they form, but emulsions stabilized by only cationic emulsifiers should not contain more than about 1% filler based on the weight of the dried coating, the presence of non-ionic stabilizers permitting filler contents up to about 20% of the weight of the dried coating. The addition of fillers increases the drying time. Whether or not fillers are incorporated, the foregoing coatings after drying can be covered with decorative top coatings. Conventional aqueous emulsion paints and particularly acrylic latexes, made very good top coatings and can be applied by brushing, rolling, spraying, dipping, or in any other manner, without deleterious effects. Solvent-thinned paints can also be applied, preferably by spraying so as to help evaporate and thus minimize the quantity of solvent applied with such paint over the asphalt-acrylic-rubber-diamine coating. Such solvents tend to dissolve into and soften the base coat.

Top coatings after drying greatly increase the resistance of the coating combination to gasoline and similar solvents. The foregoing polyacrylate resin or other polyacrylate such as polymethylacrylate is of particular benefit in increasing the resistance of the asphalt-containing mixture to such solvents. Ethylene-vinylacetate copolymers are similarly helpful in amounts up to 20% based on the weight of the dry asphalt, when dispersed into the mixture.

The polyamine surface active agents of the present invention are essential in order to get the desired corrosion protection. Emulsions prepared with other surface active agents, such as the alkyl phenoxy polyethoxyethanols, used in their place give much less protection. Preferred polyamine surface active agents are those in which amine groups are the only functional groups, such as the N-long-chain-alkyl trimethylene diamines in which the long-chain-alkyl is 12 to 30 carbons long, and chains 16 to 18 carbons long are particularly preferred. The two amine groups of the above-preferred surface active agents should have from one to three carbon atoms separating them in the molecule, and a similar separation applies to additional amine groups. Thus both N-octadecyl-trimethylene diamine and N-octadecyl-N'-(3-aminopropyl)-trimethylene diamine produce the good results of the present invention, and these compounds can have a methyl group further substituted on their primary amine groups without significantly detracting from their effectiveness. They can also be quaternized but it is preferred that the quaternary derivatives have anions such as phosphate, that do not promote corrosion.

The following examples are typical of the present invention.

EXAMPLE 1

180 pounds of solid asphalt having a penetration of 70 to 80,
15 gallons of tap water,
14.5 gallons of non-ionic poly(butylacrylate) emulsion having 50% solids by weight,
1.2 pounds N-octadecyl trimethylene diamine (technical grade-liquid)
0.4 gallons of technical phosphoric acid containing 75% $H_3PO_4$
1.5 gallons cationic SBR rubber latex (60% rubber)

The diamine and phosphoric acid are mixed with the water, the asphalt is emulsified into this mixture, and the remaining ingredients added to the resulting emulsion with stirring. A little further stirring leaves the mixture ready for application. An airless sprayer operated at 85 psig with a 30:1 reduction at the nozzle and with all filters and screens removed, applies this mixture at a very uniform rate to spray on a wet layer about 8 mils thick that dries to a tack-free smooth highly protective surface in about fifteen minutes when applied to dry rusty metal that has not been sandblasted. When a top coating is applied the base coat need not be completely dried. Even where it is necessary to walk on the base coat in order to apply the top coating, the time delay waiting for the base coat to become tack-free can be reduced to about ten minutes by dusting over its partially dried surface with finely divided inert powder, for instance silica powder such as diatomaceous silica, or talc, or mixtures of them. The dusting permits heavy base coats to be walked on after even less delay. The dusting can be from about 0.015 to about 0.075 pounds per square yard, and does not interfere with the application or the effectiveness of top coatings.

Best results are obtained according to the present invention when the asphalt-rubber emulsion is cationic and the polyamine surfactant is the dispersing agent for the asphalt, as in Example 1. However very good results are also obtained when the asphalt emulsion used to make the coating mixtures of the present invention is non-ionic or even anionic. Non-ionic asphalt emulsions on compounding with the other ingredients of the present invention will become cationic by reason of the introduction of the polyamine surface-active agent and acid. When starting with anionic asphalt emulsions it is generally necessary to first add to such emulsion a non-ionic stabilizer such as p-octylphenoxy polyethoxy ethanol having about 10 ethoxy groups. After this addition is completed and the resulting emulsions thoroughly blended, the polyamine surface active agent of the present invention is added in sufficient quantities to result in a cationic emulsion. The rubber emulsion is similarly treated if it is anionic.

EXAMPLE 2

The composition of Example 1 is varied by substituting 37 gallons of a preformed type CRS-1 asphalt emulsion for the asphalt emulsion of Example 1, using an asphalt having a penetration of 60 to 70, reducing the acrylate content to 8 gallons, and substituting for the diamine one pound of quaternized diamine made by quaternizing with excess dimethyl sulfate, adding a little water to decompose the excess dimethyl sulfate, than precipitating the sulfate anion with barium hydroxide and finally acidifying with phosphoric acid the filtrate recovered by filtering off the precipitated material.

The asphalt-acrylic-rubber-diamine emulsion made according to this modification is as effective as that of Example 1.

EXAMPLE 3

A cationic asphalt emulsion is prepared from 55 gallons of commercial CSS-1H emulsion, the asphalt of which has a penetration of from about 50 to about 90. This preparation is effected by adding to the commercial emulsion 1.7 pounds of N-tallow-alkyl propylene diamine, and then acidifying the emulsion with phosphoric acid to a pH of 5. The resulting emulsion is compounded with 12 gallons of poly(ethylacrylate) emulsion having 50% solids, and 1.8 gallons of natural rubber latex, and gives coatings with comparable qualities.

Similar results are obtained when the cationic asphalt emulsion is prepared from a non-ionic commercial emulsion.

It should be noted that when sufficient cationic surfactant is present, limited quantities of anionic rubber latices may be blended into the formulation without causing the emulsion to break. It is normally helpful to have non-ionic surfactant present when cationic and anionic ingredients are mixed.

The presence of phosphoric acid in the emulsion of the present invention also helps increase the protection imparted to rusty metal over which it is coated. As little as 0.1% of such acid by weight of the dry asphalt provides some improvement, but more than about 3% by weight of the asphalt is not desirable unless particularly heavy rust is encountered. It is generally preferred to use about 0.5 to about 1.5% phosphoric acid, although if a heavy rust layer is to be coated extra phosphoric acid can be added.

The pH of the final emulsion is desirably held at values between about 3 and about 6, but it keeps well at a pH somewhat below 3 and above 6.

An example of a suitable coating mixture having no phosphoric acid is:

EXAMPLE 4

55 gallons type QSK-H asphalt emulsion (60% asphalt by weight) in which the asphalt has a penetration of 70 to 80

10 gallons non-ionic poly(n-propyl acrylate) emulsion (50% resin by weight)

1.6 pounds N-octadecyl trimethylene diamine (technical grade-liquid)

1.6 gallons cationic SRS rubber latex (60% rubber)

As much as 16 grams of methyl cellulose can be added per gallon of final coating mixture, to increase its viscosity in order to more readily apply thicker coating layers. Corresponding amounts of other thickeners can also be used. Although about 20% acrylic resin makes a very desirable content of such resin in the coating mixture, this amount can vary and can even be doubled if desired. Any of the polymeric acrylate, methacrylate and ethacrylate esters and even polyacrylic acid can be used but butylacrylate polymers and copolymers containing a majority of butylacrylate content are preferred.

Obviously many modifications and variations of the present invention are possible in the light of the above teachings. It is, therefore, to be understood that within the scope of the appended claims the invention may be practiced otherwise than as specifically described.

What is claimed:

1. A process for protecting corrodible metal against corrosion, which processs comprises applying to the metal a layer of an emulsion of asphalt and rubber in water, the emulsion containing at least about ½% of a polyamine surface active agent based on the weight of the dry asphalt, about 2 to about 5% dispersed rubber based on the weight of the dry asphalt and about 20% of a dispersed acrylate resin based on the weight of the dry asphalt, the surface active agent being an N-alkyl alkylene diamine in which the alkyl is 12 to 30 carbons long and the two amine groups have from one to three carbon atoms separating them.

2. The combination of claim 1 in which the acrylic resin is a polybutyl acrylate.

3. The combination of claim 1 in which the emulsion also contains phosphoric acid in an amount about 0.1 to about 3% by weight of the dry asphalt.

4. The combination of claim 1 in which the rubber is a styrene-butadiene rubber.

5. The combination of claim 1 in which the emulsion is cationic, the asphalt has a penetration of 60 to 90, the polyamine surface active agent has a concentration of about 0.6 to about 1% based on the weight of the dry asphalt, the rubber is a synthetic rubber and the acrylic resin is a polybutyl acrylate.

6. The combination of claim 1 in which the metal surface is a rusty ferrous surface.

7. The combination of claim 6 in which the application of the layer to the rusty surface is made while that surface is wet with water.

8. The combination of claim 6 in which the rusty surface is not specially prepared for the coating.

9. The combination of claim 1 in which the layer is dried and a top coating is applied over it.

10. The combination of claim 9 in which the asphalt layer is dusted with an inert dust before it is tack-free and the top coating is applied by walking on the dusted coating.

11. The combination of claim 1 in which the N-alkyl alkylene diamine is an N-alkyl trimethylene diamine.

12. A composition for protecting corroded metals against additional corrosion, said composition being essentially a cationic emulsion of asphalt, an acrylate resin, and synthetic rubber in water, the emulsion containing at least about ½% of a polyamine surface active agent based on the weight of the dry asphalt, said agent being an N-alkyl alkylene diamine in which the alkyl is 12 to 30 carbons long and the two amine groups have from one to three carbon atoms separating them, the rubber content of the emulsion being between about 2 to about 5% of the weight of the dry asphalt and acrylate resin content being about 20% of the weight of the dry asphalt.

13. The combination of claim 12 in which the emulsion also contains phosphoric acid in an amount about 0.1 to about 3% by weight of the dry asphalt.

14. The combination of claim 12 in which the emulsion has its viscosity increased by a thickener that permits the application of coating layers up to 15 mils thick of the emulsion.

15. Rusty metals covered with the dried composition of claim 13.

16. The combination of claim 12 in which the N-alkyl alkylene diamine is an N-alkyl trimethylene diamine.

* * * * *